Feb. 26, 1935.  R. HALL  1,992,612
EXPANSION JOINT
Filed June 8, 1934  2 Sheets-Sheet 1
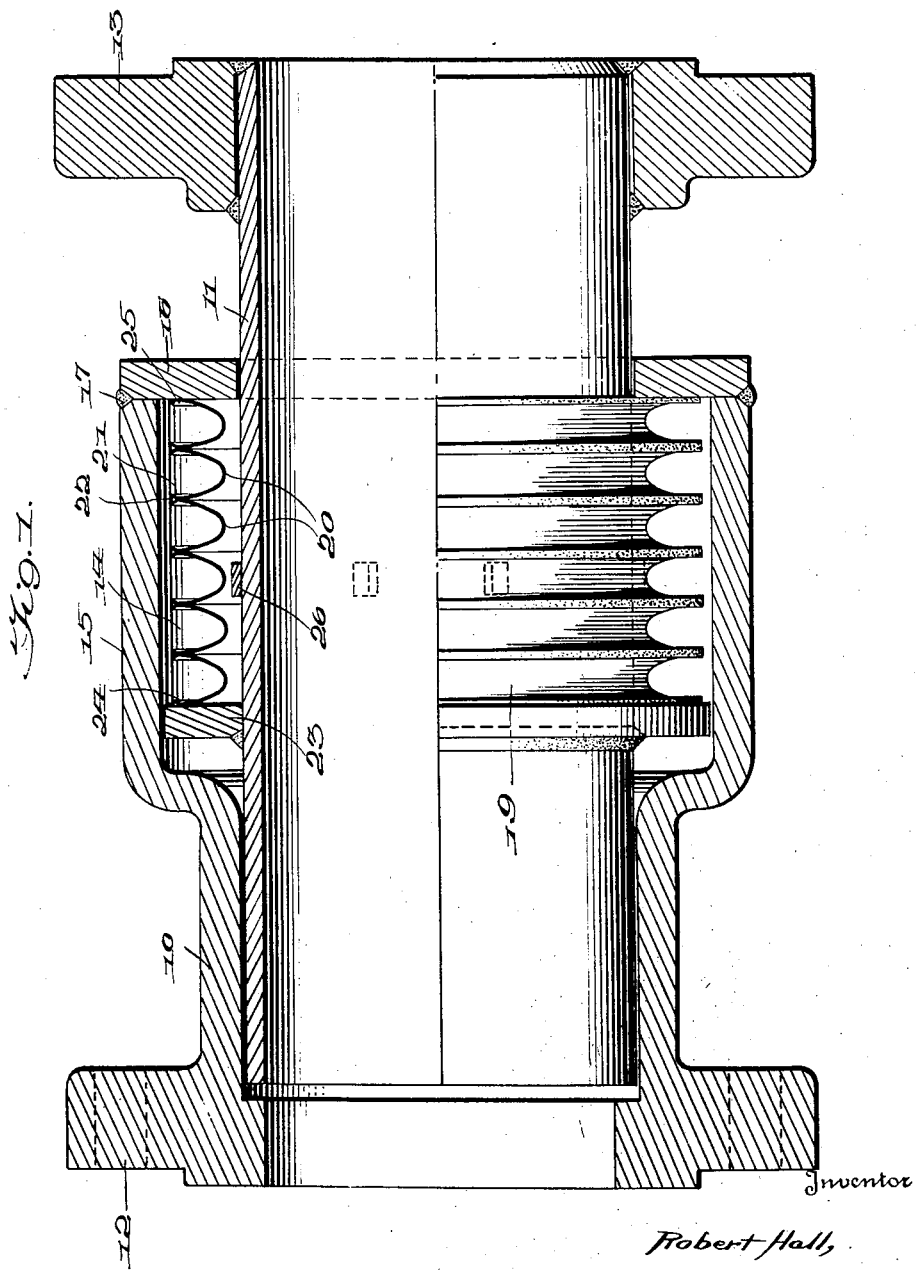
Inventor
Robert Hall,
By Edmund H. Parry Jr
Attorney Feb. 26, 1935. R. HALL 1,992,612
EXPANSION JOINT
Filed June 8, 1934 2 Sheets-Sheet 2
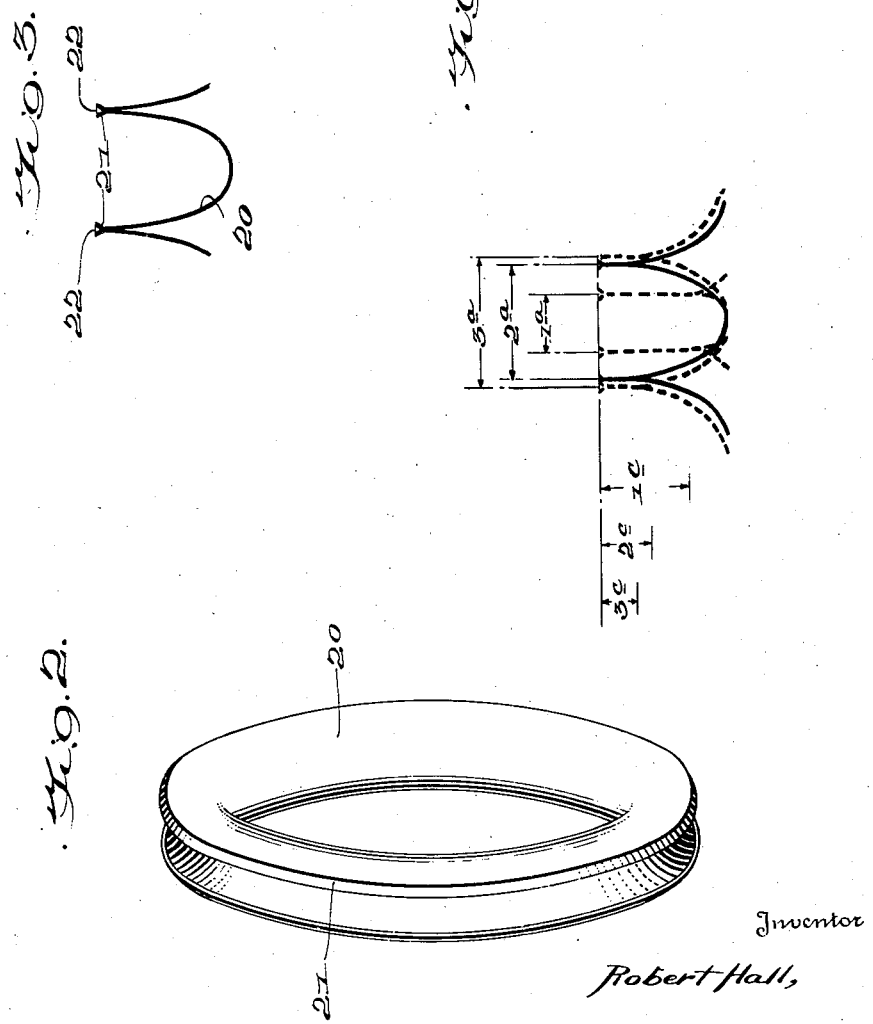
Inventor
Robert Hall,
By Edmund H. Parry Jr
Attorney Patented Feb. 26, 1935

1,992,612

UNITED STATES PATENT OFFICE 1,992,612

EXPANSION JOINT

Robert Hall, Lockport, N. Y., assignor to American District Steam Company, North Tonawanda, N. Y., a corporation of New York Application June 8, 1934, Serial No. 729,677

15 Claims. (Cl. 285—162)

This invention relates to expansion joints such as used in pipe installations carrying steam or other fluids so as to compensate for contraction and expansion of the pipe sections under varying temperature conditions.

The invention is particularly directed to expansion joints of the type utilizing a flexible element as a seal between the relatively movable joint parts. Essentially, it involves a novel form of flexible element possessing various advantages including greater flexibility and greater durability, installed in the joint in a manner such that because of its particular construction the joint may operate under far higher pressures than is possible with known constructions.

Sections of corrugated tubing have often been used as the seal in expansion joints, but have proved unsatisfactory. Under continued flexing in operation such type of element frequently breaks down and has a short life, due apparently to the concentration of strains in particular areas which cause cracks, ruptures and resulting blowouts. Probably for these reasons it is more conventional practice at the present time to utilize a series of flat resilient annuli. While in some cases such annuli are separate from each other and independently connected between the joint members, it is deemed preferable to form a series of such annuli into a unitary structure generally resembling the corrugated tubing previously referred to wherein the outer periphery is sealed to the outer periphery of the next annulus on one side and the inner periphery to the inner periphery of an annulus on the opposite side. This latter construction has proved fairly satisfactory in operation, but nevertheless has serious limitations in that blowouts often occur at the peripheral joints between the annuli. The main difficulty with such construction, however, resides in the fact that the pressure to which the sealing member is subject tends to separate the various annuli at their inner or peripheral joints, depending on the side of the member to which the line pressure is applied, and this makes it impossible to employ such type of device in pipe lines operating under relatively high pressures.

The flexible element of the present invention involves a flexible tubular member of ductile metal possessing a high elasticity and durability. A metal should be used which will not crystallize or crack under a reasonable number of flexings. The element will comprise a series of adjacent annular areas each presenting opposing upstanding wall portions which meet each other in a rounded bottom to present a hollow area therebetween. The hollow side of each successive area will open on the same side of the flexible member, and in this material respect will differ from the usual corrugated tubing. The contour of these successive areas may be broadly defined as U-shaped and the wall portions of adjacent annular areas during flexing movement will abut and reinforce each other. Such flexible member is installed between the relatively movable parts of the joint so that the pressure within the pipe line is applied to the hollow side of the various annular areas. This latter feature is extremely important for the reason, as will hereafter become more evident, that under such conditions the higher the pressure to which the flexible member is subjected the greater will be the cooperative reinforcing action between the adjacent annuli. Consequently, instead of imposing an extra strain on the flexible member, higher pressures within a wide range will serve to prevent rupture along the lines of demarcation between the successive annular areas.

While the contour, width and depth of the various annular areas may be varied within a wide range and still present a more or less U-shape form, within the scope and purpose of the invention, it is deemed preferable that the cross-sectional contour of each area take the form of a catenary curve, since such is the natural form the individual areas would assume between their peripheral edges with pressure applied to their hollow faces. By forming the flexible member as a series of adjoining catenary curves, pressure will be uniformly distributed throughout the side walls and bottom of each U-shaped annular area and undue strain and rupture will thereby be minimized.

The successive annular sections of the tubular member will usually be made up as a series of individual rings generally U-shaped in cross-section, and in their preferred embodiment taking the form of catenary curves. Such rings will be assembled with only the edge portions of side walls of successive rings seamed together in strong annular joints which leave the main portions of the side walls free to flex. The flexible member will be installed in the joint so that the pressure is applied to the hollow side of the annular areas and will therefore not tend to separate the seams such as is true in the case of the disc type of element of the prior art.

Collateral to the features so far enumerated, it is proposed to provide stops between the joint parts arranged to limit the longitudinal expansive and contractive movements of the flexible member to the normal safe operating range therefor and thereby avoid undue strains such as might result in failure. Additionally, it is proposed to secure the flexible member to the joint parts through a permanent connection or, if desired, through a removable flange connection which permits ready replacement.

The above and other features of the invention will become apparent from the following detailed description of an illustrative embodiment thereof illustrated in the accompanying drawings wherein:

Fig. 1 is a longitudinal view in section of an expansion joint with the invention applied thereto;

Fig. 2 is a perspective view of an individual hollow ring of resilient metal, the same constituting one of a series of annuli which, in the preferred adaptation of the invention, are assembled to form the flexible sealing member;

Fig. 3 is an enlarged fragmentary view showing the initial assembled relation of three of the rings of Fig. 2 before installation in the expansion joint, and the manner of joining the same at their edges. The view also illustrates generally the U-shaped cross-section of the individual rings, specifically showing a catenary curve contour, as in the preferred form of the invention of Fig. 1; and Fig. 4 is a diagrammatic view illustrating the action of the successive annular areas of the flexible member under expansion and contraction of the joint parts.

Referring now to the drawings the joint will comprise two relatively movable members 10 and 11 having respective flanges 12 and 13 for securing the same between two pipe sections. As in conventional practice the joint members are preferably arranged in telescopic relation so that the member 11 constitutes an inner member slidably engaging the inner wall of the member 10. Beyond the area of sliding engagement the outer member 10 will have an area of enlarged diameter to provide an annular chamber 14 defined by the wall section 15. Because of the construction of the flexible member hereafter to be described, the annular chamber 15 can be relatively small and compact. Closing the outer end of the chamber is an annular plate 16. Preferably this will be permanently secured to the end of the wall 15 after the flexible member has been installed, as by a welded joint 17. It may be preferable, however, in order to permit replacement of a flexible member in the chamber to make the end ring 16 removable as by means of a flanged bolted joint. The ring 16 will have a diameter such as to permit the inner joint member 11 to slide therethrough, yet being sufficiently small as to prevent foreign matter from passing into the chamber 14.

To limit the expanding movement of the flexible member, a stop is provided. This may conveniently be done by providing an area adjacent the end flange 12 of the joint member 10 of lesser diameter than the main bore, the same providing an annular shoulder coactive with the inner end of the joint member 11.

To provide a fluid tight seal between the joint parts which will not interfere with their relative movement, I provide a special form of tubular member 19. As heretofore generally indicated this member will be formed of flexible resilient sheet metal, sufficiently light to be highly flexible, but heavy enough to withstand high pressures. As best shown in Figure 1, this member will present a more or less corrugated construction which will permit longitudinal contraction and expansion. Instead of having successive hollow areas alternately at the inner and outer surfaces, the flexible member will present a longitudinal series of complete annular hollow areas defined by opposing upstanding wall portions and having a catenary or other U-shaped form in cross-section as best shown in Figure 3. The hollow side of each annular area faces on the same side of the flexible member and the wall portions of adjacent areas will abut and mutually support each other during expansion and contraction.

The flexible member is preferably made up of a series of individual annuli or rings 20 of the character shown in Figure 2. Such rings will be assembled as in Figure 3 and joined together adjacent the peripheral edges 21 of abutting side walls of the successive rings as by a weld 22. The actual joinder between the side walls of the annular rings is preferably limited to the edge area, even though the walls may be shaped to contact for a substantial portion of their length, since it is important not to unduly restrict longitudinal expansion of the flexible member. To assure a strong joint and to reinforce the rings at their adjoining peripheral edges 21, the border portion of the abutting walls of adjacent rings may be inclined away from each other so that the coacting edge portions 21 present flanges defining a small channel which receives the weld material.

With regard to the manufacture and specifications for the ring, no empirical data can be given. The catenary contour is undoubtedly the best shape as it enables the rings to withstand higher pressures, minimizes strains and ruptures, promotes flexibility, gives a wider range for longitudinal contraction and expansion of the assembled flexible member and gives the member a longer life. Due care should be had in determining the relation between the width and depth in cross-section of the rings. Such factors are important from the standpoint of minimizing strain and increasing the ability of the flexible member to operate under high pressure, as well as determining the expansion-contraction range of a flexible member containing a given number of the annular rings. By way of illustration I may state that for a 6-inch expansion joint with a maximum expansion-contraction range of 3 inches, I employ a flexible member made up of 6 rings. The U-shaped rings in cross-section are slightly deeper than they are wide, preferably having a ratio between width and depth of more than 1:1. In the installation just mentioned the rings as formed are 1⅛ inches deep, 1 inch wide at their peripheral edges and are shaped to conform to a catenary curve in cross-section.

I now consider that stainless alloy sheet steel is particularly suitable for making the rings because of its strength and resilient, or springy, character. The gauge of the metal should be carefully chosen to be thick enough to withstand the line pressures to which the flexible member will be subjected in the expansion joint, but nevertheless light enough to enable the various rings to flex under longitudinal movement of the joint members. I make the rings from sections of metal stock, bending or stamping the same to the desired U-shaped cross-section. The shaping operation is best carried out by gradually stamping and drawing the stock to its U-shape. Unless the forming operation is carried out carefully, the rings are likely to be weak and not uniformly flexible due to stretching and thinning of the metal at their peripheral edges which will cause the thickness of the ring walls to vary at different transverse points between the inner and outer ring peripheries.

In the illustrative embodiments of the invention in the various views of the drawings, the hollow sides of the annular areas of the flexible member face outwardly. It will be understood, however, that the hollow sides might face inwardly, and such is contemplated within the scope of the invention. The important thing is that the member as described be arranged between the joint parts in such manner that the pressure existing within the joint members be applied to the hollow sides of the annular areas. In the illustrative embodiment of Figure 1, since the hollow sides face outwardly, the connections between the flexible member and the two joint members 10 and 11 is such that the pressure will be applied to the outer surface of the flexible member 19. With this object in view, an annular ring 23 is secured, as by welding, to the outer periphery of the inner joint member 11, the same to work under contraction and expansion in the left half of the flexible member chamber 14. The connection between the flexible member and the inner joint member 11 will be made by connecting the left end wall 24 of the flexible member to the annular ring 23. Similarly the opposite end wall 25 of the flexible member will be secured to the end ring 16 forming a part of the outer joint member 10. With such arrangement pressure will be transmitted from within the joint to the portion of the annular chamber 14 outwardly of the flexible member.

With the arrangement just described, as the joint members 10 and 11 contract one within the other the flexible member will expand in length, and, alternatively, when the joint parts move apart the flexible member will compress. The stop formed by shoulder 18 at the end of the outer joint member to limit inward movement of the joint parts has already been described. To limit outward movement, an additional stop, shown in the drawings as an annularly arranged series of small protuberances or blocks 26, may be secured to the inner joint member adapted to engage the end ring 16 when the joint member 11 slides outwardly from the position shown in Figure 1.

Referring again to the flexible member 19, the advantages of the peculiar contour thereof whether taking the catenary or other U-shaped form will be further appreciated by considering the diagrammatic showing of Figure 4, the same representing one complete annular section with portions of the two adjacent sections. The heavy line showing of such figure corresponds to the contour of the various annular sections when the joint members are in the almost fully contracted position shown in Figure 1. The various sections will then have a width designated arbitrarily by the distance 2ª. To an extent depending upon the exact cross-sectional contour of the sections, a substantial portion of their abutting walls will be in contact, although as above indicated it is desirable that they be actually joined only adjacent the peripheral edges. The portions of the walls in contact for the catenary shape illustrated is represented by the arrow 2ᶜ for the position under consideration. When the inner joint member 11 moves further inwardly to its extreme contracted position as determined by the stop 18, the various annular sections will flex to assume the first dotted line position. Under such circumstances the width of each individual section will increase to the distance represented by the arrow 3ª and the depth will remain the same. Since the flexible member is elongating in assuming this position, the extent of contact between the walls of adjacent sections will decrease slightly from 2ᶜ to 3ᶜ.

Conversely, when the joint members move apart to cause the flexible member to assume its completely contracted position as determined by the stops 26, the shape of the various annular sections will change to that shown in the second dotted line position of Figure 4. Under such circumstances the width of the annular members as determined by the distance between their opposing side walls will decrease to that indicated by the arrow 1ª, and the depth will again remain the same. At the same time the extent of contact between the side walls of adjacent sections will increase and extend for the distance 1ᶜ.

Tests have shown that while the annular sections change in contour in the manner described as the flexible member is elongated and compressed, the inside diameter of such sections remain substantially constant.

The amount of contact between the abutting side walls of adjacent annular sections of the flexible member, as has been more or less arbitrarily illustrated in Figure 4, at this point will to a large extent be governed by the degree of pressure existing within the joint, and by whether the various annular sections have adjacent walls which slope abruptly away from each other below their joined edges or extend substantially parallel in their normal shape. Since under any circumstances the pressure is applied to the hollow annular sides of the flexible member it will be evident that, as long as the pressure exceeds the atmospheric pressure existing on the opposite side of the flexible member, the line pressure instead of tending to separate the abutting walls of adjacent annular sections will force such walls together to cause the same to mutually reinforce each other. It is for this reason that there is no danger of blowouts between the abutting walls of the various sections, such as is likely to occur if the line pressure were applied from the opposite side of the flexible member, or also if a different type of flexible member were utilized wherein the pressure would be applied to the underside of the seams between adjacent parts.

The exact shape of the series of annular sections is subject to a considerable variation from that of the embodiment of the drawings wherein the preferred catenary curve form is shown. The main point is that each section be hollow with their edges facing all on the same side. The walls of each area as formed may extend parallel to each other and substantially perpendicular to the axis of the flexible member, but to promote flexibility and avoid undue compressive strain it is desirable that the walls extend at a slope.

For purposes of shipment the joint members 10 and 11 are forced apart until the stops 26 contact the end ring 16, this bringing the annular sections of the flexible member to their fully compressed position as found in the second dotted line showing of Fig. 4 and indicated therein by arrows 1ª and 1ᶜ. Blocks or equivalent wedges are then interposed between ring 16 and flange 13 of the inner joint member 11 to hold the various parts rigid. After the joint has been positioned the wedges are removed to allow the flexible member to expand to its neutral position wherein the annular elements making up the same assume the normal shape in which they were originally formed and assembled.

The joint members will be interconnected between the adjoining sections of the pipe line with the flexible member in its neutral position as determined by the operating temperature conditions of the pipe line. With reference to Fig. 4, the annular rings of the flexible member will be in their normal non-compressed and unexpanded shape at some position between the fully compressed dotted line showing (1a—1c) and the partially expanded heavy line showing (2a—2c), and by reference to Fig. 1 the neutral position will exist when the joint parts are telescoped to a somewhat less extent than in the main view of Fig. 1.

When the line is in operation under normal conditions the flexible member will be in neutral position, or substantially so; when the temperature rises the pipe line elongates to move the joint members toward each other and elongate the flexible member; and, conversely, when the temperature falls below normal operating conditions the pipe contracts to pull the joint members apart and compress the flexible member.

The essential features of my invention are not limited to the particular detailed embodiments thereof herein illustrated and described, particularly as it has been found that various changes may be made without detracting from the advantages of the construction over previously known devices. It has been found that the construction will work satisfactorily under line pressures as high as 1200 pounds, and it is quite possible that the invention will work satisfactorily and without failure for long periods of time under even higher pressures.

The scope of the invention is intended to include reasonable variations and modifications from the embodiments herein specifically set forth, and the scope thereof is to be determined from the appended claims.

I claim:

1. An expansion joint comprising a pair of alined relatively movable joint members and a tubular body of resilient sheet material having fluid-tight connection with said joint members and forming a seal therebetween, said tubular member having a succession of annular channel-shaped areas arranged immediately adjacent each other with the side wall of one channel area meeting that of the next along an annular line, rendering the member extensible and contractible under longitudinal movement of the joint members, the hollow faces of all said areas facing on the side of the flexible member which is in communication with the interior of the joint members.

2. An expansion joint comprising a pair of alined relatively movable joint members and a tubular body of resilient sheet material having fluid-tight connection with said joint members and forming a seal therebetween, said tubular member being formed as a series of contiguous annular channel-shaped areas with their hollow sides all facing on the side of the member which is exposed to pressure from within the joint members, said annular areas having a cross-sectional contour defined by a catenary curve.

3. An expansion joint comprising a pair of alined relatively movable joint members and a tubular body of resilient sheet material having fluid-tight connection with said joint members and forming a seal therebetween, said tubular member being formed as a series of similarly formed immediately adjacent annular channel-shaped areas with their hollow sides all facing on the side of the member which is exposed to fluid pressure from within the joint members, the side wall portions of adjacent channel areas at, and inwardly of, their edge areas being maintained in contiguous relation by the fluid pressure.

4. An expansion joint comprising a pair of alined relatively movable joint members and a tubular body of resilient sheet material having fluid-tight connection with said joint members and forming a seal therebetween, said tubular members being longitudinally extensible and contractible and being formed as a series of annular channel-shaped areas all facing on the side of the member exposed to fluid pressure from within the joint members, the adjacent channel areas meeting along annular lines at their peripheries and having wall portions adapted to be maintained in reinforcing contact with each other by the fluid pressure applied to said hollow channel areas.

5. An expansion joint comprising a pair of alined relatively movable joint members and a tubular body of resilient sheet material having fluid-tight connection with said joint members and forming a seal therebetween, said tubular member being longitudinally extensible and contractible and being formed as a series of annular channel-shaped areas all having their hollow faces on the side of the member which is exposed to fluid pressure from within the joint members, the adjacent channel areas meeting at their edges and each presenting a continuous unbroken surface between its edges, the wall portions of adjacent channel areas adjacent said edges being maintained in reinforcing contact with each other by the fluid pressure to which the hollow faces of the channel areas are exposed from within the joint members.

6. An expansion joint comprising a pair of alined relatively movable joint members and a tubular body of resilient sheet material having fluid-tight connection with said joint members and forming a seal therebetween, said tubular member being longitudinally flexible and being formed to comprise a series of U-shaped annular channel areas lying in contiguous relation and presenting each an unbroken and continuous hollow face on the side of the member which is exposed to fluid pressure from within the joint members.

7. An expansion joint comprising a pair of alined relatively movable joint members and a tubular body of resilient sheet material having fluid-tight connection with said joint members and forming a seal therebetween, said tubular member being arranged between the joint members so that fluid pressure from within the joint members is applied to the outer surface thereof and presenting a series of contiguous U-shaped annular areas with their hollow faces all on the outer side of the member.

8. An expansion joint comprising a pair of alined relatively movable joint members and a tubular body of resilient sheet material having fluid-tight connection with said joint members and forming a seal therebetween, said tubular member comprising a plurality of independent hollow rings of channel-shaped cross-section arranged side by side in contiguous relation and joined together at their peripheral edges, the hollow sides of said rings all facing on the side of the member which is exposed to fluid pressure from within the joint members.

9. An expansion joint comprising a pair of alined relatively movable joint members and a tubular body of resilient sheet material having fluid-tight connection with said joint members and forming a seal therebetween, said tubular member comprising a plurality of similarly formed extensible and compressible hollow rings presenting open faces on the side of the member which is exposed to fluid pressure from within the joint members and seamed one to the next at their edges.

10. An expansion joint comprising a pair of alined relatively movable joint members and a tubular body of resilient sheet material having fluid-tight connection with said joint members and forming a seal therebetween, said tubular member comprising a plurality of similarly formed flexible rings having a catenary curve cross-section with their hollow faces exposed to fluid pressure from within the joint members, said rings lying in contiguous relation and being joined together at their edges.

11. An expansion joint comprising a pair of alined relatively movable joint members and a tubular body of resilient sheet material having fluid-tight connection with said joint members and forming a seal therebetween, said tubular member comprising a series of similarly formed flexible annuli of channel-shaped cross-section joined one to the next at their edges in fluid-tight seams, the hollow faces of said annuli and the outer surfaces of said joining seams all facing on the side of the member which is exposed to fluid pressure from within the joint members, whereby the fluid pressure serves to prevent splitting or rupture of the seams under extension and contraction of the flexible member.

12. An expansion joint comprising a pair of alined relatively movable joint members and a tubular body of resilient sheet material having fluid-tight connection with said joint members and forming a seal therebetween, said tubular member comprising a series of similarly formed flexible annuli of channel-shaped cross-section joined one to the next adjacent their edges in fluid-tight seams, the hollow faces of the annuli and the outer surfaces of said joining seams all facing on the same side of the member and being exposed to fluid pressure acting on the side wall portions of the annuli to reinforce the seams.

13. An expansion joint comprising a pair of alined relatively movable joint members and a tubular body of resilient sheet material having fluid-tight connection with said joint members and forming a seal therebetween, said tubular member comprising a series of similarly formed flexible rings of channel-shaped cross-section disposed all with their hollow faces on the side of the member which is exposed to fluid pressure from within the joint members, successive rings being joined together at their edges in fluid tight seams and having unconnected side wall portions adjacent said edges maintainable in reinforcing contact with each other by the fluid pressure applied to the hollow faces.

14. An expansion joint comprising a pair of telescoping joint members, an annular chamber between said joint members adjacent the outer end of the outer member, an annular plate secured to the outer end of said outer joint member closing said annular chamber and removable to give access to the chamber, and a flexible tubular member in said chamber connecting with the inner and outer joint members and forming a seal therebetween.

15. An expansion joint comprising a pair of telescoping joint members, an annular chamber between said members adjacent the outer end of the outer member, a flexible tubular member in said chamber having fluid-tight connection with the inner and outer joint members and forming a seal therebetween, an annular plate secured to the outer end of the outer member and closing said chamber, a shoulder on the inner joint member operating in the area of the chamber and coactive with said annular plate to limit outward movement between the joint members, and a further stop to limit inward movement between the joint members.

ROBERT HALL.